Patented Aug. 12, 1930

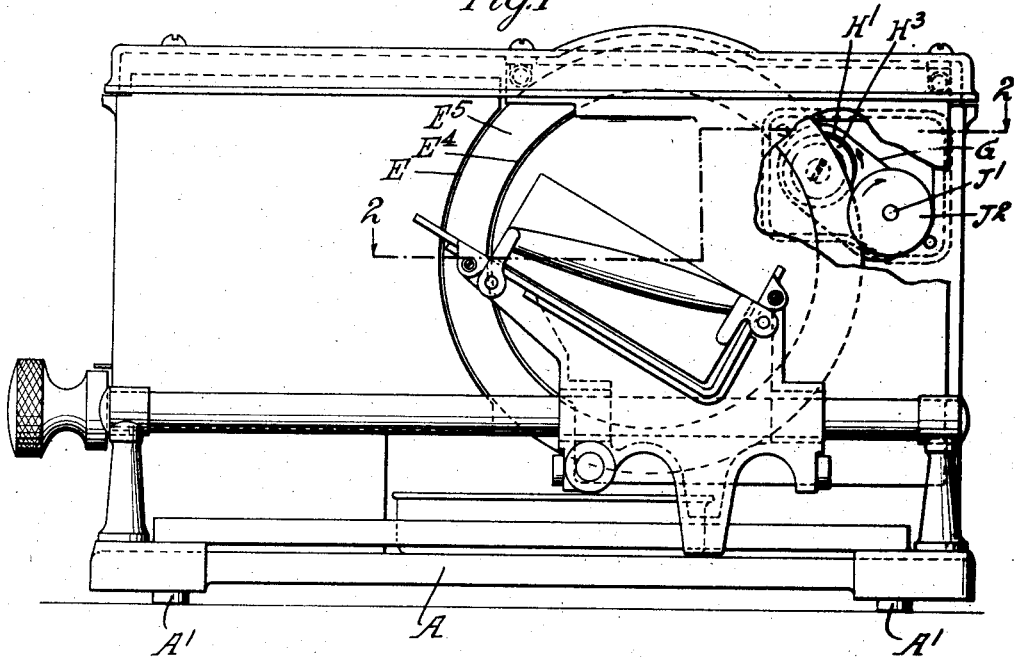

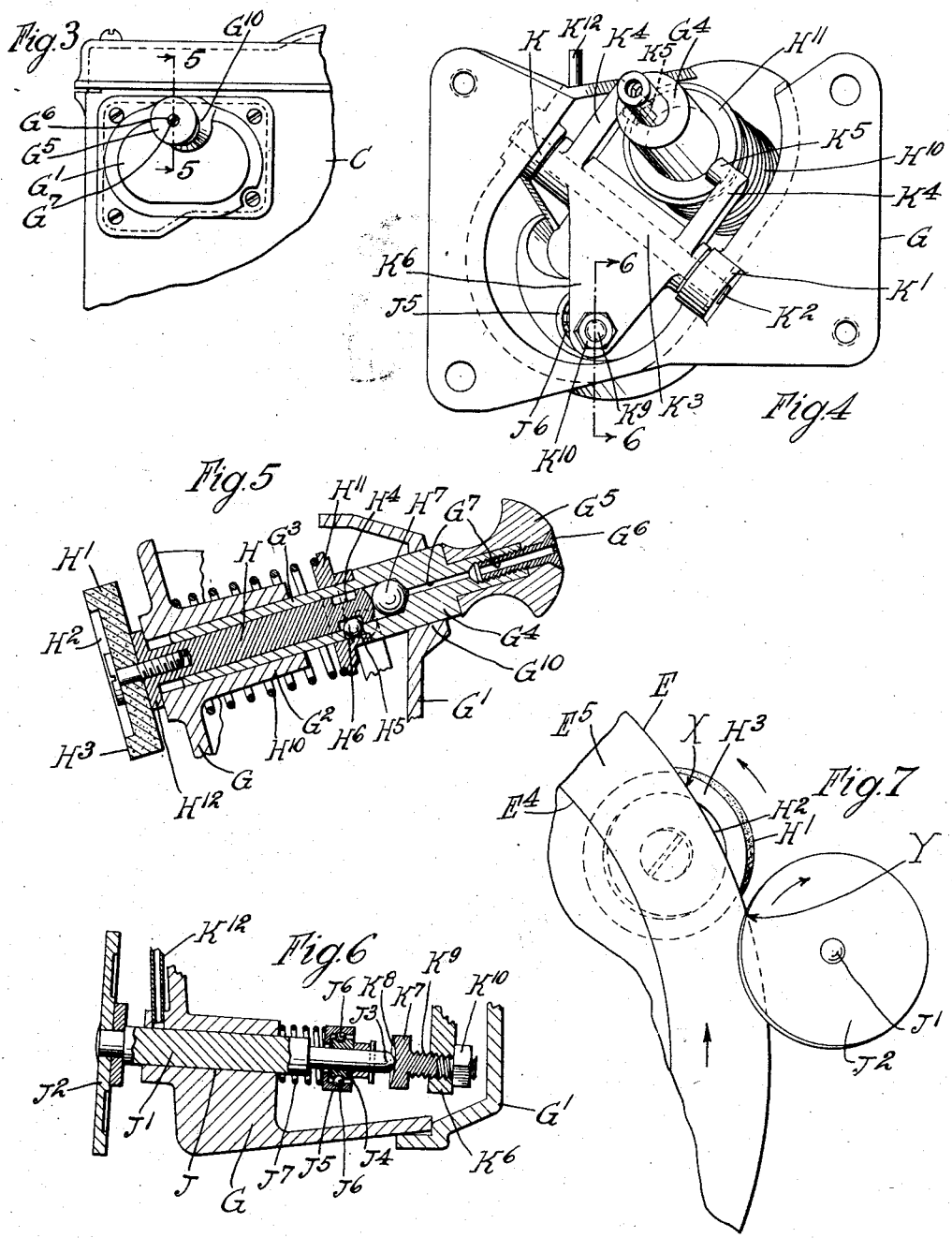

1,772,704

UNITED STATES PATENT OFFICE

WILLIAM J. CAMPBELL, OF INDIANAPOLIS, INDIANA, ASSIGNOR TO AMERICAN SLICING MACHINE COMPANY, OF CHICAGO, ILLINOIS, A CORPORATION OF NEW YORK

KNIFE SHARPENER FOR SLICING MACHINES

Application filed July 8, 1927. Serial No. 204,208.

My invention relates to a slicing machine, having a rotary knife, and relates particularly to means for sharpening said knife in response to the rotation thereof. A particular purpose is the provision of grinding or sharpening means which shall be effective to sharpen the knife, while preventing the formation of a burr upon the knife edge. Another object is the provision of sharpening means including opposed grinding and burr removing members on opposite sides of the knife. Another purpose is the provision of such opposed sharpening and burr removing means, and means for effecting the engagement of said burr remover prior to the engagement of said grinding member, and for holding said burr remover in engagement with the knife until after the grinding member is removed from operative engagement therewith.

I illustrate my invention more or less diagrammatically in the drawings wherein—

Figure 1 is an elevation;

Figure 2 is a section on the line 2—2 of Figure 1;

Figure 3 is an elevation of the sharpening assembly;

Figure 4 is a view of such assembly on an enlarged scale with the cover plate removed;

Figure 5 is a section on the line 5—5 of Figure 3;

Figure 6 is a section on the line 6—6 of Figure 4; and

Figure 7 is an illustration, on an enlarged scale, with relation of the grinding and burr removing members to the knife edge.

Like parts are indicated by like symbols throughout the specification and drawings.

A generally indicates any suitable base frame or member, provided for example with the supporting studs $A^1$.

Any suitable motor means may be provided, as shown in Fig. 2, for actuating the driving belt B, herein shown as of triangular cross-section, to engage the inclined faced channel $B^1$ on the pulley $B^2$.

C is a knife supporting sleeve mounted on the base A and including the shield portion $C^1$. Mounted within the sleeve portion C is the inner sleeve D on which are mounted the ball bearing tracks $D^1$ to support the balls $D^2$ opposed to the inner tracks $D^3$ on the knife shaft $D^4$. $D^5$ are locking nuts whereby to secure the knife shaft and roller bearing together, the shaft $D^4$ being enlarged as at $D^6$ to engage the inner forward ball track $D^3$.

E is the knife disc proper, secured to the shaft assembly for example by the screw $E^1$, and additionally secured to the pulley $B^2$, for example by the screws $E^2$. The knife disc is shown as convex and is peripherally cut away or recessed on its hollow face as at $E^4$, to lift a peripheral portion $E^5$ projecting somewhat forward from the face of the knife.

Referring to Figure 2 G generally indicates a sharpener housing having a cover plate $G^1$. Integral with the housing member G, as shown in Figure 5, is the inwardly projecting tubular bearing member $G^2$. Mounted for axial movement therealong is the hollow pusher or plunger sleeve $G^3$ herein shown as integral with the generally slotted portion $G^4$ to which is secured the external handle $G^5$. $G^6$ is a securing screw for said handle and $G^7$ indicates an oil duct extending through said screw and through the member $G^4$ to the central aperture of the sleeve $G^3$.

Rotatable in the hollow sleeve $G^3$ is the grinder shaft H which is secured to the end of the cupped grinding element $H^1$ with the central aperture $H^2$ and the annular knife engaging surface $H^3$. The member H is recessed at the inner end as at $H^4$ to engage the locking ball $H^5$ which seats in a recess $H^6$ in the wall of the sleeve $G^3$. $H^7$ is a single bearing ball interposed between the end of the member H and the inner end of the hollow center of the sleeve $G^3$. It will be understood that the combined plunger element $G^3$ $G^4$ may be thrust axially along the bearing sleeve $G^2$, being also aligned by the bearing $G^{10}$ and the cover cap $G^1$ which is co-axial with the sleeve $G^2$. It is normally held in withdrawn position by the spring $H^{10}$ which is compressed between the inside of the housing G and the collar $H^{11}$ on the member $G^3$ $G^4$. The member H is laterally expanded as at $H^{12}$ in order to engage the outer face of the housing G, to limit the movement of the grinding elements in response to expansion of the spring H¹⁰.

J indicates a second bearing formed in the wall of the housing G, in which rotates the burr remover shaft J¹ which carries at its outer end the burr removing disc J². The shaft J¹ terminates in a rounded end J³ and is provided with an inner ball race J⁴. J⁵ is an outer ball race and J⁶ J⁶ indicate bearing balls therebetween. Compressed between the outer ball race J⁵ and the opposed wall of the housing G is a coil spring J⁷, of substantially less strength than the spring H¹⁰.

Secured as at K K¹ is a pin K² upon which rotates the lever generally indicated as K³. It includes the lever arms K⁴ K⁴, each with the inward projection K⁵ adapted to engage the member H¹¹ on the push plunger G³ G⁴. K⁶ is a lever arm to the end of which is adjustably secured the member K⁷ cupped as at K⁸ to engage the rounded end J³ of the shaft J¹. The member K⁷ is shown as adjustable for example by means of the screw-threaded stem K⁹ and the lock nut K¹⁰. K¹² is any suitable oiling duct extending to the sleeve J.

It will be realized that whereas I have described and shown a practical and operative device nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

The grinding member H¹ is normally held in withdrawn position by the action of the spring H¹⁰. The operator, by thrusting against the handle G⁵, may compress the spring and thrust the grinding member against the knife blade, as shown in Figure 2. The degree of pressure exerted depends upon the thrust given by the operator against the handle G⁵. The grinder grinds off the bevel side of the knife. When the grinder is thus thrust against the knife, if means were not employed to prevent it a burr would form at the knife edge, tending to curl over on the opposite side of the knife. In order to prevent the formation of such a burr I provide the burr removing member J², which may for example be a steel disc. The burr remover is normally held out of contact with the knife, also in response to the action of the spring H¹⁰, by means of the lever member K⁶ and the member K⁷ mounted at the end thereof. The member K⁷ engages the rounded end J³ of the shaft J, being thrust positively thereagainst by the action of the spring H¹⁰ against the lever arms K⁴ through the engagement of the inward projections K⁵ with the collar H¹¹. When a positive thrust on the handle G⁵ moves the lever member K⁶ to the right, as shown in Figure 6, the shaft J¹ is released and the spring J⁷ then moves the shaft to the right, as shown in Figure 6, and thrusts the disc J² into contact with the flat face of the knife.

It will be realized that under no circumstances can the burr remover engage the knife until a thrust on the handle G⁵ overcomes the spring H¹⁰ and permits the spring J⁷ to move the shaft J¹. I so proportion the parts, however, that the burr removing disc J² will contact the knife blade before the grinding member H¹ contacts the opposite side. Also the burr remover is not withdrawn from the knife until after the grinding member is withdrawn. It thus results that the burr remover engages the knife prior to the grinding member, and is withdrawn from it only after the grinding member is withdrawn.

Furthermore the thrust of the burr remover against the knife is fixed, and is entirely out of the control of the operator. In practice this is a considerable advantage, since the burr remover, or the thrust of the spring which controls it, may be set or controlled at the factory at the proper strength to remove the burr, and the careless user has no opportunity to exert an unnecessarily strong thrust against the knife.

The angularity of the grinding and burr removing elements towards the rotary knife E is illustrated in Figures 2, 5 and 6, the purpose of which is to have each sharpening element contact the knife only at one point. As indicated in Figure 7, the grinding member H¹ when in operation, touches the knife at the point X and the burr removing disc J² contacts the knife at the point Y, thereby rotating the sharpening elements in the directions as shown by arrows in Figures 1 and 7. In practice I have found the angles most suitable to give the desired results for the grinding member H¹ to be 12° both in the vertical and horizontal plane, for the burr removing disc J² to be 7° in the horizontal plane and 3° 30′ in the vertical plane.

It will be understood that in employing the term "burr remover", I wish to differentiate between the member J² and the ordinary grinding member such as H¹, the grinding member being of any suitable abrasive substance, the burr remover being preferably nonabrasive or at least less abrasive than the grinder. The purpose for so providing is that the burr remover may be applied to the edge of the knife before, during and after the grinding operation proper, without grinding down or wearing the knife edge to any substantial degree. In practice a steel disc may be employed or any other substance which, in relation to an abrasive, may be described as smooth. The term is used relatively in the claims, and is not intended to limit me to any specific degree of smoothness but merely to point out that a member is employed which does not substantially grind or exert a grinding action against the knife edge.

The mere positioning of a burr remover, such as a steel disc, in the plane of the knife edge and against the knife edge, presents to the burr which is turned over by the grinding a member which is rigid in its own plane and which thrusts the burr back into the plane of the cutting edge of the knife. This is in contrast to the employment of a grinder which actually grinds off the opposed face of the knife. The steel disc may shear off the burr, if the burr is loose or weak, and if it is not it moves it back into the knife plane.

I claim:

1. In association with a slicing machine having a rotary knife and means for driving it, a burr removing member mounted for engagement with one side of said knife, a grinding member mounted for engagement with the opposite side of said knife, yielding means urging said burr removing member toward said knife, means for moving said grinding member toward said knife, and means controlled by said grinder-moving means for normally restraining said yielding means, but freeing it upon initial movement of said grinder-moving means, whereby said burr removing member may engage said knife in advance of said grinder member, said structure including unitary mounting means for the burr removing and the grinding members, including the lever adapted to be actuated in unison with a movement of the grinding member toward or away from the knife, and an actuating connection between said lever and the burr removing member.

2. The structure of claim 1 characterized by the provision of yielding means for holding said lever normally in position to oppose the movement of the burr removing member toward the knife.

3. The structure of claim 1 characterized by the provision of yielding means for holding said lever normally in position to oppose the movement of the burr removing member toward the knife, said last mentioned yielding means urging the burr removing member toward the knife.

Signed at Indianapolis, county of Marion and State of Indiana, this 29th day of June, 1927.

WILLIAM J. CAMPBELL.